(12) United States Patent
Yamashita et al.

(10) Patent No.: US 8,802,590 B2
(45) Date of Patent: Aug. 12, 2014

(54) INDIUM ADSORBENT, INDIUM ADSORBENT PRODUCING METHOD, AND INDIUM ADSORPTION METHOD

(75) Inventors: Keiji Yamashita, Mie (JP); Yasuhito Inagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 759 days.

(21) Appl. No.: 12/877,362

(22) Filed: Sep. 8, 2010

(65) Prior Publication Data

US 2011/0061495 A1 Mar. 17, 2011

(30) Foreign Application Priority Data

Sep. 15, 2009 (JP) ................. P2009-213044

(51) Int. Cl.
*B01J 20/26* (2006.01)
*C07C 69/34* (2006.01)

(52) U.S. Cl.
USPC ........................... 502/402; 560/190

(58) Field of Classification Search
USPC .................. 502/400–439
See application file for complete search history.

(56) References Cited

U.S. PATENT DOCUMENTS

| | | | |
|---|---|---|---|
| 2007/0191551 A1 | 8/2007 | Kim et al. | |
| 2008/0038188 A1 | 2/2008 | Ohnishi et al. | |
| 2008/0221248 A1 | 9/2008 | Kim et al. | |
| 2008/0264868 A1* | 10/2008 | Murray et al. | 210/684 |

FOREIGN PATENT DOCUMENTS

| | | |
|---|---|---|
| JP | 8-091838 | 4/1996 |
| JP | 2000-135435 | 5/2000 |
| JP | 2000-169991 | 6/2000 |
| JP | 2007-050333 | 3/2007 |
| JP | 2007050333 A * | 3/2007 |
| JP | 2002-69684 | 3/2008 |
| WO | 2007/055767 | 5/2007 |

OTHER PUBLICATIONS

Machine translation of JP 2007-050333 A.*
European Search Report for Application No. 10009295.6-1270/2295139 dated Jul. 19, 2011.
Adsorption of Metal ions on Gallium(III)-Templated Oxine Type of Chemically Modified Chitosan. Inoue et al., Separation Science and Technology, Dekker, NewYork, NY, US, vol. 31, No. 16, Jan. 1, 1006, pp. 2273-2285, XP008137563, ISSN: 0149-6395 *the whole document*.
Metal ion-imprinted polymers—Novel materials for selective recognition of inorganics, Rao et al., Analytica Chimica Acta, Elsevier, Amsterdam, NL, vol. 578, No. 2, Sep. 25, 2006, pp. 105-116, XP025047761, ISSN: 0003-2670, DOI: 10.1016/J.ACA.2006.06.065 (retrieved on Sep. 25, 2006) *the whole document*.
Separation of gallium and indium from ores matrix by sorption on amberlite XAD-2 coated with PAN, Bermejo-Barrera, Fresenius Journal of Analytical Chemistry, vol, 360b, Sep. 23, 2000, pp. 191-194, XP002641019, *the whole document8.

* cited by examiner

*Primary Examiner* — Kaj K Olsen
*Assistant Examiner* — Jared Wood
(74) *Attorney, Agent, or Firm* — K&L Gates LLP

(57) ABSTRACT

An indium adsorbent is provided that is obtained by the following process. A hydrophilic polymer having a carboxyl group in which indium is incorporated in advance is caused to absorb an aqueous solution of a water-soluble monomer, a cross-linking agent, and a polymerization initiator, and an acid treatment is performed on a polymer obtained by polymerizing the water-soluble monomer, to obtain the indium adsorbent. The indium adsorbent has a template architecture with respect to indium. Accordingly, the indium adsorbent is capable of adsorbing indium with a high selectivity. An indium selection rate is 2.0 or more with respect to zinc.

12 Claims, No Drawings

INDIUM ADSORBENT, INDIUM ADSORBENT PRODUCING METHOD, AND INDIUM ADSORPTION METHOD

CROSS REFERENCES TO RELATED APPLICATIONS

The present application claims priority to Japanese Priority Patent Application JP 2009-213044 filed in the Japan Patent Office on Sep. 15, 2009, the entire content of which is hereby incorporated by reference.

BACKGROUND

The present application relates to an indium adsorbent. More specifically, the present application relates to an indium adsorbent made of a polymer material having a template architecture with respect to indium.

With a rapid development of a recent liquid crystal technology, demand for ITO (indium tin oxide) used as a transparent conductive film for liquid crystal is markedly increasing. An ITO target material is used as a material for an ITO film. In related art, some indium recovering methods have been proposed in which an ITO target scrap and the like are used as materials.

For example, Japanese Patent Application Laid-open No. HEI 08-091838 (hereinafter, referred to as Patent Document 1) discloses a method of manufacturing an indium oxide including: a first step of leaching out an indium inclusion with a nitric acid to obtain an indium nitrate solution; a second step of extracting, with an organic solvent, an indium ion from the indium nitrate solution obtained in the first step, and performing back extraction on an extract obtained, to obtain an indium aqueous solution; and a third step of hydrolyzing the indium aqueous solution obtained in the second step, and roasting an indium hydroxide obtained, to obtain an indium oxide.

Further, Japanese Patent Application Laid-open No. 2000-169991 (hereinafter, referred to as Patent Document 2) discloses an indium recovering method including: a dissolving step of dissolving an indium inclusion with a hydrochloric acid; a neutralizing step of neutralizing an obtained solution by adding alkali thereto, and causing a predetermined metal ion in the solution to precipitate to be removed; a sulfurizing step of insufflating the neutralized solution obtained with a hydrogen sulfide gas, and causing a metal ion that is harmful in a following electrolyzing step to precipitate as sulfide to be removed; and a step of performing electrowinning of an indium metal.

Furthermore, Japanese Patent Application Laid-open No. 2002-69684 (hereinafter, referred to as Patent Document 3) discloses an indium recovering method including a step of dissolving an ITO indium-containing scrap with a hydrochloric acid to obtain an indium chloride solution; a step of adding a sodium hydroxide solution into the indium chloride solution to remove tin contained in the scrap as tin hydroxide and further adding a sodium hydroxide solution to obtain indium hydroxide; a step of filtering indium hydroxide and thereafter adding a sulfuric acid to obtain indium sulfate; and performing electrowinning of indium.

On the other hand, a polymer material having a template architecture is known as a carrier for efficiently adsorbing a certain kind of adsorption-target substance. The polymer material specifically adsorbs the adsorption-target substance by preparing a polymer having a template architecture with respect to the adsorption-target substance or a part thereof.

For example, Japanese Patent Application Laid-open No. 2000-135435 (hereinafter, referred to as Patent Document 4) discloses a polymer separating agent having a template architecture with respect to an estrogen compound or an estrogen-like substance. Patent Document 4 describes that the polymer separating agent can be produced by a known method (see, paragraph 0011 in Patent Document 4). The known method herein refers to a method of mixing an estrogen compound or the like (template guest) as an adsorption target with a polymerizable monomer to be polymerized, and thereafter removing the template guest, to form a polymer having a template architecture with respect to a guest compound.

SUMMARY

By the method disclosed in Patent Document 1, a high-purity inorganic acid indium aqueous solution can be produced from an ITO scrap material or the like. However, in the method, a solvent extraction method is used in which a complicated process of repeatedly performing extraction and back extraction is necessary, and a cost problem arises because of the use of an expensive solvent. Also, in the methods disclosed in Patent Documents 2 and 3, it is necessary to use large amounts of various acids, alkalis, or organic solvents in order to separate and recover indium.

Further, such methods in related art use a technique of recovering indium from an unused ITO target material or an adhesion matter to a sputtering apparatus, and hardly recover indium from a used target material or a defective product such as a glass substrate or the like in a manufacturing process. In particular, there is a problem in that, in indium recovery from an adhesion matter to the sputtering apparatus, the adhesion matter is rubbed off from the sputtering apparatus or a chamber, so an impurity is mixed therein at that time.

Further, the separation, recovery, or reuse of indium from an etching liquid waste of a conductive film or a flat panel display has hardly been performed. There is demand for a technique of recovering high-purity indium therefrom to reuse high-purity indium as a valuable substance having a high marketability.

In view of the above-mentioned circumstances, it is desirable to provide a technique of separating and recovering high-purity indium easily at a low cost.

According to an embodiment, there is provided an indium adsorbent including a polymer material having a template architecture with respect to indium, the indium adsorbent having an adsorption selection rate of indium with respect to zinc of 2.0 or more.

The indium adsorbent is obtained by causing a hydrophilic polymer having a carboxyl group into which indium is incorporated to absorb an aqueous solution of a water-soluble monomer, a cross-linking agent, and a polymerization initiator, polymerizing the water-soluble monomer to obtain a polymer, and performing an acid treatment on the polymer obtained.

In the indium adsorbent, it is desirable that the hydrophilic polymer has an incorporation rate of indium thereto of 20% or more, and the polymer has a content rate of the water-soluble monomer of 40 wt % or less. In addition, it is desirable that the water-soluble monomer and the cross-linking agent have a molar ratio of 100:1 to 1:1.

According to another embodiment, there is provided an indium adsorbent producing method including: causing a hydrophilic polymer having a carboxyl group into which indium is incorporated to absorb an aqueous solution of a water-soluble monomer, a cross-linking agent, and a polymerization initiator, and polymerizing the water-soluble monomer to obtain a polymer; and performing an acid treatment on the polymer obtained.

The indium adsorbent producing method may further include causing the hydrophilic polymer to absorb an indium aqueous solution.

In the indium adsorbent producing method, it is desirable that the indium aqueous solution is set to have a concentration of 3 mM or more, and the aqueous solution of the water-soluble monomer, the cross-linking agent, and the polymerization initiator is caused to be absorbed by a 1-fold volume or more with respect to a weight of the hydrophilic polymer. In addition, it is desirable that the water-soluble monomer and the cross-linking agent have a molar ratio of 100:1 to 1:1.

According to another embodiment, there is provided a method of adsorbing indium by causing the indium adsorbent described above to be in contact with an aqueous solution containing indium.

In an embodiment, the "template architecture with respect to indium" refers to an architecture formed in a polymer by polymerizing (performing template polymerization) a polymerizable monomer in the presence of indium serving as a template guest, and then removing indium from the polymer. The template architecture has a property capable of retaining indium with high selectivity as compared to other substances.

The "adsorption selection rate of indium to the hydrophilic polymer" refers to a ratio by weight of the adsorption amounts of indium ions to metal ions other than the indium ions with respect to the indium adsorbent (adsorption amount of indium ions/adsorption amount of metal ions other than indium ions). The higher the adsorption selection rate, the higher the adsorption selectivity of the adsorbent with respect to indium becomes.

The "incorporation rate of indium to the hydrophilic polymer" refers to a ratio of the weight of indium incorporated into the carboxyl group of the hydrophilic polymer to the dry weight of the hydrophilic polymer (weight of indium/dry weight of the hydrophilic polymer).

The "content rate of the water-soluble monomer in the polymer" refers to a ratio of the weight of an adsorbed water-soluble monomer to the weight (solid content weight) of a hydrophilic polymer that has absorbed the aqueous solution of the water-soluble monomer, the cross-linking agent, and the polymerization initiator (weight of water-soluble monomer/weight of solid content). The solid content weight is obtained by subtracting the weight of a water content from the total weight of the hydrophilic polymer before and after the aqueous solution absorption. The weight of the solid content can be obtained based on the weight of the hydrophilic polymer before and after the aqueous solution absorption and the concentration of the water-soluble monomer, the cross-linking agent, and the polymerization initiator in the aqueous solution. In addition, the weight of the water-soluble monomer can be obtained based on the increase in the weight of the hydrophilic polymer before and after the solution absorption and the concentration of the water-soluble monomer in the solution.

According to embodiment, a technique of separating and recovering high-purity indium simply at a low cost can be provided.

Additional features and advantages are described herein, and will be apparent from the following Detailed Description and the figures.

DETAILED DESCRIPTION

The present application will be described below according to an embodiment. It should be noted that the following embodiment is an example of a representative embodiment, and does not limit the scope of the present application. The description will be given in the following order.

1. Indium adsorbent
(1) Template architecture with respect to indium and adsorption selection rate
(2) Hydrophilic polymer
(3) Water-soluble monomer, cross-linking agent, and polymerization initiator
2. Indium adsorbent manufacturing method
(1) First step
(2) Second step
(3) Third step
3. Indium adsorption method
1. Indium adsorbent
(1) Template Architecture with Respect to Indium and Adsorption Selection Rate An indium adsorbent according to an embodiment is obtained by the following process. That is, a hydrophilic polymer having a carboxyl group in which indium is incorporated in advance is caused to absorb an aqueous solution of a water-soluble monomer, a cross-linking agent, and a polymerization initiator, and an acid treatment is performed on a polymer obtained by polymerizing the water-soluble monomer, to obtain the indium adsorbent. The indium adsorbent has a template architecture with respect to indium. Accordingly, the indium adsorbent is capable of adsorbing indium with a high selectivity. An indium selection rate is 2.0 or more, desirably 3.0 or more, with respect to zinc.

(2) Hydrophilic Polymer

A hydrophilic polymer used for the indium adsorbent according to an embodiment is not particularly limited as long as the hydrophilic polymer is a polymer containing a monomer having a carboxyl group as a structural unit. Further, it is also possible to use a polymer containing a monomer as a structural unit having a functional group in which an indium ion can be incorporated, such as a hydroxyl group, an amide group, and a sulfonic group, in addition to the carboxyl group.

As the polymer containing, as a structural unit, a monomer having a carboxyl group, a hydrophilic polymer typified by an acrylic acid can be used, for example. For the hydrophilic polymer formed of an acrylic acid, a commercially available polymer can be used. For example, a starch-acrylic acid graft copolymer, a polyacrylate polymer, or a vinyl acetate-acrylate copolymer can be used. Of those, the starch-acrylic acid graft copolymer is desirable.

(3) Water-Soluble Monomer, Cross-Linking Agent, and Polymerization Initiator

A water-soluble monomer, a cross-linking agent, and a polymerization initiator that are known in related art can be used for the indium adsorbent according to an embodiment in combination as appropriate.

As the water-soluble monomer, it is possible to use at least one kind of acrylamide, methacrylamide, acetone acrylamide, N,N-dimethyl acrylamide, N,N-dimethyl methacrylamide, N-ethyl methacrylamide, N-ethyl acrylamide, N,N-diethyl acrylamide, N-propyl acrylamide, N-acryloyl pyrrolidine, N-acryloyl piperidine, N-acryloyl morpholine, hydroxy ethyl methacrylate, hydroxy ethyl acrylate, hydroxy propyl methacrylate, hydroxy propyl acrylate, various methoxy polyethylene glycol (meta) acrylate, N-vinyl-2-pyrolidone, an unsaturated carboxylic acid such as an acrylic acid, a methacrylic acid, an itaconic acid, a maleic acid, and a fumaric acid, and salts thereof, a vinyl sulfonic acid, a styrene sulfonic acid, or an acrylamide methylpropanesulfonic acid, and salts thereof, and amine such as N,N-dimethyl aminoethyl methacrylate, N,N-diethyl aminoethyl methacrylate, N,N-dimethyl aminoethyl acrylate, N,N-dimethyl amino propyl methacryl amide, or N,N-dimethyl amino propyl acrylamide, and salts thereof (including quaternary compounds).

As the cross-linking agent, it is possible to use at least one kind of a bifunctional cross-linking monomer such as methylene bis acrylamide, methylene bis(meta) acrylamide, ethylene bis acrylamide, ethylene bis(meta) acrylamide, ethylene glycol diacrylate, ethylene glycol dimethacrylate, diethylene glycol diacrylate, diethylene glycol dimethacrylate, triethylene glycol diacrylate, triethylene glycol dimethacrylate, divinylbenzene, and diarylacrylamide, and a polyfunctional cross-linking monomer such as 1,3,5-triacryloyl hexahydro-S-triazine, triallyl isocyanurate, triacryl pentaerythritol, trimethyrolpropane acrylate, tryacryl formal, and diacryloylimide.

For the water-soluble monomer and the cross-linking agent, acrylamide and methylene bis acrylamide are desirably used.

As the polymerization initiator, a water-soluble one can be used. For example, it is possible to use ammonium persulfate (APS), potassium persulfate, peroxide such as hydrogen peroxide and tert-butyl hydroperoxide, a redox type initiator such as sulfite, bisulfate, and cerium (II) ammonium nitrate, an azo compound such as vitamin C, 2,2'-azobis-2-amidino propane acid salt, 2,2'-azobis-2,4-dimethylvaleronitrile, 4,4'-azobis-4-cyanovaleric acid, and salts thereof. Those polymerization initiators are used individually or in combination of two or more.

2. Indium Adsorbent Manufacturing Method

An indium adsorbent manufacturing method according to an embodiment includes the following steps.

First step: a step of causing a hydrophilic polymer to absorb an indium aqueous solution Second step: a step of causing a hydrophilic polymer in which indium is incorporated to absorb an aqueous solution of a water-soluble monomer, a cross-linking agent, and a polymerization initiator, to polymerize a water-soluble monomer Third step: a step of performing an acid treatment on a polymer obtained (1) First Step A first step is a step of causing a hydrophilic polymer to absorb an indium aqueous solution and incorporating an indium ion in a carboxyl group of a hydrophilic polymer.

In this step, a hydrophilic polymer is immersed in an indium aqueous solution, which is prepared to have a predetermined concentration, for a predetermined time period while being stirred, thereby causing the hydrophilic polymer to absorb the indium aqueous solution. At this time, the hydrophilic polymer absorbs the indium aqueous solution and swells, and an indium ion is incorporated in the carboxyl group of the hydrophilic polymer.

For the indium aqueous solution, an indium sulfate aqueous solution or the like is used. The concentration of the indium aqueous solution is desirably set to 3 mM or more. By setting the concentration of the indium aqueous solution to such a range of values, 20% or more of an incorporation rate of the indium into the hydrophilic polymer is obtained, with the result that the adsorption selectivity of the indium adsorbent obtained can be increased. On the other hand, if the concentration of the indium aqueous solution is lower than the range of the values, the incorporation rate of an indium ion into the hydrophilic polymer is lowered, and a rate of free carboxyl groups is increased, with the result that the adsorption selectivity of the indium adsorbent is lowered.

It is possible to cause the indium ion aqueous solution to be absorbed by immersing the hydrophilic polymer in the indium ion aqueous solution having at least 400-fold volume with respect to the dry weight of the hydrophilic polymer. When the amount of absorption of the indium aqueous solution becomes small, it is difficult to cause the hydrophilic polymer to uniformly swell.

(2) Second Step

A second step is a step of causing the hydrophilic polymer in which indium is incorporated in the first step to absorb an aqueous solution of a water-soluble monomer, a cross-linking agent, and a polymerization initiator, and performing a polymerization reaction of the water-soluble monomer.

Prior to this step, it is desirable to take the hydrophilic polymer that has been immersed in the indium aqueous solution out of the aqueous solution and dry the hydrophilic polymer, in order to cause the hydrophilic polymer to sufficiently absorb the aqueous solution of the water-soluble monomer, the cross-linking agent, and the polymerization initiator.

The hydrophilic polymer can be dried by performing suction filtration on the indium aqueous solution in which the hydrophilic polymer is immersed, to separate gel, and drying the gel separated by a drying method such as hot-air drying, freeze drying, and reduced pressure drying.

In this step, the hydrophilic polymer is immersed in the aqueous solution of the water-soluble monomer, the cross-linking agent, and the polymerization initiator (hereinafter, also referred to as "aqueous solution of a water-soluble monomer and the like"), which is prepared to have a predetermined concentration, for a predetermined time period while being stirred, thereby causing the hydrophilic polymer to absorb the aqueous solution of the water-soluble monomer and the like. At this time, the hydrophilic polymer dried absorbs the aqueous solution of the water-soluble monomer and the like and swells.

It is desirable to perform the swelling of the hydrophilic polymer while being immersed in the aqueous solution of the water-soluble monomer and the like having at least 200-fold volume relative to the polymer. As a result, it is possible to cause the hydrophilic polymer to uniformly absorb the aqueous solution of the water-soluble monomer and the like. Further, it is desirable to cause the hydrophilic polymer to absorb the aqueous solution of the water-soluble monomer and the like by an amount of at least 1-fold volume relative to the polymer.

A molar ratio of the water-soluble monomer to the cross-linking agent is normally 100:1 to 1:1, desirably 20:1 to 5:1. If an additive amount of the cross-linking agent is less than the range of values, the adsorption selectivity of the indium adsorbent is lowered. On the other hand, if the additive amount of the cross-linking agent is more than the range of values, an adsorption amount itself of various metal ions including indium is reduced.

A usage of the polymerization initiator is normally 0.01 to 10 wt %, desirably 0.05 to 8 wt %, with respect to the water-soluble monomer.

The polymerization reaction can be performed under a general reaction condition after the hydrophilic polymer swollen is taken out of the aqueous solution of the water-soluble monomer and the like. By the polymerization reaction, a cross-linking polymerization of the water-soluble monomer and the cross-linking agent proceeds. At this time, an indium ion that is incorporated into a carboxyl group of the hydrophilic polymer functions as a template guest, and a structure to be a template architecture with respect to indium is formed in the polymer.

Polymerization conditions such as a reaction time period, a temperature, a dissolved oxygen concentration, and an apparatus to be used are set to optimal conditions as necessary in accordance with kinds of a water-soluble monomer, a cross-linking agent, and a polymerization initiator to be used. A polymerization temperature is set to be equal to or higher than a transition temperature (generally, 0 to 100° C.) of a polymer aqueous solution generated. It is desirable to perform the polymerization reaction under a nitrogen atmosphere.

It should be noted that it is desirable to set the content rate of the water-soluble monomer in the polymer to 40 wt % or less (see, "Table 1" below).

(3) Third Step

A third step is a step of removing an indium ion from the polymer by performing an acid treatment on the polymer obtained in the second step.

The acid treatment for the polymer can be performed by washing, with distilled water, the polymer obtained after the reaction when necessary, and then immersing the polymer into an acid aqueous solution. By the immersion into the acid aqueous solution, an indium ion incorporated in the carboxyl group of the hydrophilic polymer is desorbed and eluted, with the result that the template architecture with respect to an indium ion is completed in the polymer.

The acid used in the treatment may be an organic acid or an inorganic acid. Desirably, an inorganic acid is used, and more desirably, a hydrochloric acid is used. It should be noted that the concentration of the acid aqueous solution is set to 0.01 to 1 N (prescription), desirably 0.1 N. The amount of the acid aqueous solution is approximately set to 1000-fold volume with respect to the weight of the polymer immersed.

An immersion time period in the acid aqueous solution is varied depending on a temperature condition or the like, but is generally set to approximately 3 hours. It should be noted that the temperature is desirably set to a room temperature.

After this step, the polymer that has been subjected to the acid treatment is washed to be neutralized (pH: 7). At this time, an alkaline aqueous solution (for example, aqueous solution containing sodium hydroxide having 0.01 N) may be used for washing to adjust pH, but distilled water is used for the last washing. After the washing, drying is performed by a drying method such as hot-air drying, freeze drying, and reduced pressure drying, thereby obtaining the indium adsorbent.

Herein, the description is given on the method in which, after an indium ion is incorporated in advance into the polymer containing, as a structural unit, the monomer having the carboxyl group, the polymer is caused to absorb the water-soluble monomer aqueous solution, and the template polymerization is performed, with the result that the polymer serving as the indium adsorbent is obtained. As another method for obtaining a polymer serving as the indium adsorbent according to the embodiment, a method can be considered in which a water-soluble monomer having a carboxyl group is mixed with an indium aqueous solution, and an aqueous solution of a cross-linking agent and a polymerization initiator is added thereto, thereby performing the template polymerization.

3. Indium Adsorption Method

The indium adsorbent according to an embodiment has the template architecture with respect to indium, and adsorbs indium with the high selectivity. Therefore, the adsorbent can be used for recovery with high purity by selectively adsorbing an indium ion mixed with other metal ions in the solution.

For example, an elution obtained by eluting, using an acid, a crushed matter of a used flat panel display (FPD) containing ITO or a used ITO target material is brought into contact with the indium adsorbent. As a result, the adsorbent is caused to selectively adsorb an indium ion from among a plurality of metal ions mixed in the elution. Then, the adsorbent after adsorbing an indium ion is used as a material for a known electrolytic refining (see, for example, Japanese Patent Application Laid-open No. HEI 6-248370), thereby recovering indium with high purity.

In addition, indium can also be recovered by performing a treatment, with water or an acid, on the adsorbent after the adsorption of an indium ion and eluting an indium ion again. In this case, the adsorbent can be reused, which is more economical.

By using the indium adsorbent according to an embodiment, the adsorbent brought into contact with the solution containing an indium ion is eluted again by the electrolytic refining or by using water or an acid, with the result that high-purity indium can be recovered by the simple process at a low cost.

EMBODIMENTS

Embodiment 1

1. Production of Indium Adsorbent

An indium adsorbent is produced according to the following steps.

(1) First Step

As a hydrophilic cross-linking polymer (AAc gel) formed of an acrylic acid, a commercially available water-absorbent resin (ST-500: produced by Sanyo Chemical Industries, Ltd.) was used. A dried AAc gel of 300 mg and an 200-ml $In_2(SO_4)_3$ aqueous solution prepared to have 5 mM were mixed into a 500-ml recovery flask and stirred at a room temperature for 24 hours.

After that, the AAc gel precipitated in a static state was separated from the aqueous solution through suction filtration, and the gel was washed with distilled water and dried by freeze drying, to obtain white powders. It should be noted that the concentration of indium in the aqueous solution before and after the immersion was measured (measurement using ICP-MS) to determine an indium ion amount incorporated in the AAc gel. The indium ion amount of 2.51 mmol/g (28.8 wt %: relative to weight of dried AAc) was obtained.

(2) Second Step

Next, to a mixed solution of 25 ml in which acrylamide (AAm) as a water-soluble monomer, methylene bis acrylamide (MBA) as a cross-linking agent, and ammonium persulfate (APS) as a polymerization initiator having the concentrations of 1.5 mM, 0.015 mM, and 0.015 mM, respectively, were dissolved, a 100-mg dried AAc gel in which indium was incorporated was added, and caused to swell by being immersed and stirred at a room temperature.

At this time, a mixed solution having 1.19-fold volume relative to the weight of the dried AAc gel was absorbed (content rate of acrylamide accounts for 11.2 wt % of total gel).

The gel swollen was put in a screw-top test tube, and nitrogen substitution was performed. After that, the test tube was hermetically sealed, and polymerization was performed at 60° C. for 24 hours.

(3) Third Step

Next, the gel was taken out of the test tube, washed with distilled water, thereafter immersed in a 0.1 N hydrochloric acid aqueous solution of 200 ml, and stirred at a room temperature for 3 hours.

Further, the gel was washed with distilled water until the pH of the gel reached 7, and the gel was immersed for 5 minutes in a 0.01 N NaOH aqueous solution of 200 mL. Then, the gel was washed again with distilled water until the pH of the gel reached 7. After that, the gel was dried by freeze drying. As a result, white powders of the indium adsorbent of 131 mg were obtained.

2. Adsorption Test

The obtained indium adsorbent of 10 mg was put in a mixed solution of 10 ml, in which indium and zinc were dissolved so that the concentrations of the indium ions and the zinc ions were set to 5 mM, and then stirring was performed for 4 hours at a room temperature. The concentrations of the ions in the aqueous solution before and after the indium adsorbent was put in were measured (ICP-MS), thereby determining the amounts of both the ions adsorbed by the adsorbent.

As a result, indium of 1.01 mmol/g and zinc of 0.31 mmol/g were obtained. The adsorption selectivity with respect to the indium ions was confirmed (adsorption selection rate of In/Zn: 3.25).

In the first step, the amount of indium ions incorporated into the AAc gel was 1.81 mmol/g (20.8 wt %: relative to the weight of dried AAc).

In addition, in a second step, a mixed solution having 5.47-fold volume relative to the weight of the dried AAc gel was absorbed (content rate of acrylamide accounts for 36.6 wt % of total gel).

2. Adsorption Test

An adsorption effect of the adsorbent obtained with respect to the metal ions was confirmed in the same way as Example 1. As a result, the amounts of ions of indium and zinc that were adsorbed by the adsorbent were 1.25 mmol/g and 0.41 mmol/g, respectively. It was recognized that the adsorption selectivity with respect to the indium ions was high (adsorption selection rate of In/Zn: 3.05).

| No. | Incorporation of In to AAc | | Template polymerization of AAc by AAm | | Effect by indium adsorbent | | |
|---|---|---|---|---|---|---|---|
| | Concentration of In solution (mM) | Content rate of In (In/AAc: wt %) | Monomer solution adsorption ratio (ml/g:to dried AAc) | AAm rate (AAm: wt %) | Adsorption amount (mmol/g) | | Adsorption selectivity rate |
| | | | | | In | Zn | In/Zn |
| Example 1 | 5 | 28.8 | 1.19 | 11.2 | 1.01 | 0.31 | 3.25 |
| Example 2 | 4 | 27.2 | 1.88 | 16.6 | 0.73 | 0.30 | 2.43 |
| Example 3 | 3 | 20.8 | 5.47 | 36.6 | 1.25 | 0.41 | 3.05 |
| Comparative example 1 | 2.5 | 16.8 | 36.9 | 78.1 | 0.35 | 0.30 | 1.23 |
| Comparative example 2 | 2 | 12.3 | 65.1 | 85.8 | 0.09 | 0.22 | 0.41 |
| Comparative example 3 | 1 | 4.7 | 78.4 | 87.6 | 0.09 | 0.19 | 0.47 |
| Comparative example 4 | 0 | 0 | 76 | 87.3 | 0.14 | 0.43 | 0.33 |
| Comparative example 5 | Commercially-available ion-exchange resin | | | | 0.80 | 1.00 | 0.80 |

Example 2

1. Production of Indium Adsorbent

In a first step, an indium adsorbent was produced in the same way as in Example 1 except that the concentration of an $In_2(SO_4)_3$ aqueous solution absorbed by a dried AAc gel was set to 4 mM.

In the first step, the amount of indium ions incorporated into the AAc gel was 2.37 mmol/g (27.2 wt %: relative to the weight of dried AAc).

In addition, in a second step, a mixed solution having 1.88-fold volume relative to the weight of the dried AAc gel was absorbed (content rate of acrylamide accounts for 16.6 wt % of total gel).

2. Adsorption Test

An adsorption effect of the adsorbent obtained with respect to the metal ions was confirmed in the same way as Example 1. As a result, the amounts of ions of indium and zinc that were adsorbed by the adsorbent were 0.73 mmol/g and 0.30 mmol/g, respectively. It was recognized that the adsorption selectivity with respect to the indium ions was high (adsorption selection rate of In/Zn: 2.43).

Example 3

1. Production of Indium Adsorbent

In a first step, an indium adsorbent was produced in the same way as in Example 1 except that the concentration of an $In_2(SO_4)_3$ aqueous solution absorbed by a dried AAc gel was set to 3 mM.

Comparative Example 1

1. Production of Indium Adsorbent

In a first step, an indium adsorbent was produced in the same way as in Example 1 except that the concentration of an $In_2(SO_4)_3$ aqueous solution absorbed by a dried AAc gel was set to 2.5 mM.

In the first step, the amount of indium ions incorporated into the AAc gel was 1.46 mmol/g (16.8 wt %: relative to the weight of dried AAc).

In addition, in a second step, a mixed solution having 36.9-fold volume relative to the weight of the dried AAc gel was absorbed (content rate of acrylamide accounts for 78.1 wt % of total gel).

2. Adsorption Test

An adsorption effect of the adsorbent obtained with respect to the metal ions was confirmed in the same way as Example 1. As a result, the amounts of ions of indium and zinc that were adsorbed by the adsorbent were 0.35 mmol/g and 0.30 mmol/g, respectively. The adsorption selectivity with respect to the indium ions was low (adsorption selection rate of In/Zn: 1.23).

Comparative Example 2

1. Production of Indium Adsorbent

In a first step, an indium adsorbent was produced in the same way as in Example 1 except that the concentration of an $In_2(SO_4)_3$ aqueous solution absorbed by a dried AAc gel was set to 2 mM.

In the first step, the amount of indium ions incorporated into the AAc gel was 1.07 mmol/g (12.3 wt %: relative to the weight of dried AAc).

In addition, in a second step, a mixed solution having 65.1-fold volume relative to the weight of the dried AAc gel was absorbed (content rate of acrylamide accounts for 85.8 wt % of total gel).

2. Adsorption Test

An adsorption effect of the adsorbent obtained with respect to the metal ions was confirmed in the same way as Example 1. As a result, the amounts of ions of indium and zinc that were adsorbed by the adsorbent were 0.09 mmol/g and 0.22 mmol/g, respectively. The adsorption selectivity with respect to the indium ions was not recognized (adsorption selection rate of In/Zn: 0.41).

Comparative Example 3

1. Production of Indium Adsorbent

In a first step, an indium adsorbent was produced in the same way as in Example 1 except that the concentration of an $In_2(SO_4)_3$ aqueous solution absorbed by a dried AAc gel was set to 1 mM.

In the first step, the amount of indium ions incorporated into the AAc gel was 0.41 mmol/g (4.7 wt %: relative to the weight of dried AAc).

In addition, in a second step, a mixed solution having 78.4-fold volume relative to the weight of the dried AAc gel was absorbed (content rate of acrylamide accounts for 87.6 wt % of total gel).

2. Adsorption Test

An adsorption effect of the adsorbent obtained with respect to the metal ions was confirmed in the same way as Example 1. As a result, the amounts of ions of indium and zinc that were adsorbed by the adsorbent were 0.09 mmol/g and 0.19 mmol/g, respectively. The adsorption selectivity with respect to the indium ions was not recognized (adsorption selection rate of In/Zn: 0.47).

Comparative Example 4

1. Production of Indium Adsorbent

An indium adsorbent was produced in the same way as in Example 1 except that a first step is omitted, and in a second step, a dried AAc gel into which indium was not incorporated was caused to absorb a monomer aqueous solution.

In the second step, a mixed solution having 76-fold volume relative to the weight of the dried AAc gel was absorbed (content rate of acrylamide accounts for 87.3 wt % of total gel).

2. Adsorption Test

An adsorption effect of the adsorbent obtained with respect to the metal ions was confirmed in the same way as Example 1. As a result, the amounts of ions of indium and zinc that were adsorbed by the adsorbent were 0.14 mmol/g and 0.43 mmol/g, respectively. The adsorption selectivity with respect to the indium ions was not recognized (adsorption selection rate of In/Zn: 0.33).

Comparative Example 5

1. Production of Indium Adsorbent

With the use of a commercially-available ion-exchange resin (Amberlite IRI20B Na: Organo Corporation), the adsorbent effect with respect to indium ions and zinc ions in a mixed solution thereof was studied in the same manner as Example 1.

As a result, the amounts of ions of indium and zinc that were adsorbed by the adsorbent were 0.80 mmol/g and 1.00 mmol/g, respectively. The adsorption selectivity with respect to the indium ions was not recognized (adsorption selection rate of In/Zn: 0.80).

The indium adsorbent according to an embodiment selectively adsorbs the indium ions that are mixed with other metal ions in a liquid. Therefore, the indium adsorbent can be used for recovering high-purity indium from an ITO garget scrap, an adherent to a sputtering apparatus, crushed matters of a FPD, an etching waste liquid of a conductive film, or the like. Further, the use of the indium adsorbed allows indium to be recovered without using various kinds of acids or alkalis or organic solvents unlike the methods in related art, which can contribute to simplification and reduction in the cost of the recovery process and natural resource saving of chemicals or water.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An indium adsorbent comprising:
a polymer material having a template architecture with respect to indium, the indium adsorbent having an adsorption selection rate of indium with respect to zinc of 3.0 or more,
wherein the indium absorbent is obtained by causing a hydrophilic acrylic acid polymer having a carboxyl group into which indium is incorporated to absorb an aqueous solution of a water-soluble monomer, a cross-linking agent, and a polymerization initiator, polymerizing the water-soluble monomer to obtain a polymer, and performing an acid treatment on the polymer obtained.

2. The indium adsorbent according to claim 1, wherein the hydrophilic polymer has an incorporation rate of indium thereto of 20% or more.

3. The indium adsorbent according to claim 2, wherein the formed polymer has a content rate of the water-soluble monomer of 40 wt % or less.

4. The indium adsorbent according to claim 2, wherein the water-soluble monomer and the cross-linking agent have a molar ratio of 100:1 to 1:1.

5. The indium adsorbent according to claim 1, wherein the indium absorbent is obtained by utilizing, in addition to the hydrophilic polymer, a polymer containing a monomer as a structural unit having a functional group in which an indium ion can be incorporated, the monomer being selected from the group consisting of a hydroxyl group, an amide group, a sulfonic group, and the carboxyl group.

6. The indium adsorbent according to claim 1, wherein the acrylic acid is selected from the group consisting of a starch-acrylic acid graft copolymer, a polyacrylate polymer, and a vinyl acetate-acrylate copolymer.

7. The indium adsorbent according to claim 1, wherein the acrylic acid is a starch-acrylic acid graft copolymer.

8. The indium adsorbent according to claim 1, wherein the water-soluble monomer is at least one kind selected from the group consisting of acrylamide, methacrylamide, acetone acrylamide, N,N-dimethyl acrylamide, N,N-dimethyl methacrylamide, N-ethyl methacrylamide, N-ethyl acrylamide, N,N-diethyl acrylamide, N-propyl acrylamide, N-acryloyl pyrrolidine, N-acryloyl piperidine, N-acryloyl morpholine, hydroxy ethyl methacrylate, hydroxy ethyl acrylate, hydroxy propyl methacrylate, hydroxy propyl acrylate, various methoxy polyethylene glycol (meta) acrylate, N-vinyl-2-pyrolidone, an unsaturated carboxylic acid such as an acrylic acid, a methacrylic acid, an itaconic acid, a maleic acid, and a fumaric acid, and salts thereof, a vinyl sulfonic acid, a styrene sulfonic acid, or an acrylamide methylpropanesulfonic acid, and salts thereof, and an amine selected from the group consisting of N,N-dimethyl aminoethyl methacrylate, N,N-diethyl aminoethyl methacrylate, N,N-dimethyl aminoethyl acrylate, N,N-dimethyl amino propyl methacryl amide, and N,N-dimethyl amino propyl acrylamide, and salts thereof (including quaternary compounds).

9. The indium adsorbent according to claim 1, wherein the cross-linking agent is at least one kind selected from the group consisting of a bifunctional cross-linking monomer selected from the group consisting of methylene bis acrylamide, methylene bis(meta) acrylamide, ethylene bis acrylamide, ethylene bis(meta) acrylamide, ethylene glycol diacrylate, ethylene glycol dimethacrylate, diethylene glycol diacrylate, diethylene glycol dimethacrylate, triethylene glycol diacrylate, triethylene glycol dimethacrylate, divinylbenzene, and diarylacrylamide, and a polyfunctional cross-linking monomer selected from the group consisting of 1,3,5-triacryloyl hexahydro-5-triazine, triallyl isocyanurate, triacryl pentaerythritol, trimethyrolpropane acrylate, tryacryl formal, and diacryloylimide.

10. The indium adsorbent according to claim 1, wherein the water-soluble monomer is acrylamide, and the cross-linking agent is methylene bis acrylamide.

11. The indium adsorbent according to claim 1, wherein the polymerization initiator is water-soluble.

12. The indium adsorbent according to claim 11, wherein the polymerization initiator is at least one selected from the group consisting of ammonium persulfate (APS), potassium persulfate, a peroxide that is either hydrogen peroxide or tert-butyl hydroperoxide, a redox type initiator such as sulfite, bisulfite, and cerium (II) ammonium nitrate, an azo compound such as vitamin C, 2,2'-azobis-2-amidino propane acid salt, 2,2'-azobis-2,4-dimethylvaleronitrile, 4,4'-azobis-4-cyanovaleric acid, and salts thereof.

* * * * *